(12) United States Patent
Nägele et al.

(10) Patent No.: US 6,241,842 B1
(45) Date of Patent: *Jun. 5, 2001

(54) TRANSFER FOIL FOR PRINTING ON OBJECTS AND OBJECTS PRINTED THEREWITH

(75) Inventors: Gilbert Nägele; Heinrich Wollensack, both of Kehl; Klaus Schöttle, Strasbourg, all of (DE)

(73) Assignee: EMTEC Magnetics GmbH, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,835
(22) PCT Filed: Aug. 29, 1996
(86) PCT No.: PCT/EP96/03798
§ 371 Date: May 22, 1998
§ 102(e) Date: May 22, 1998
(87) PCT Pub. No.: WO97/09180
PCT Pub. Date: Mar. 13, 1997

(30) Foreign Application Priority Data

Sep. 8, 1995 (DE) .......................................... 295 14 420 U

(51) Int. Cl.⁷ .............................. B44C 1/17; B32B 31/18; B41M 3/12; G03C 8/00
(52) U.S. Cl. .................. 156/240; 156/230; 156/247; 156/250; 156/252; 156/257; 427/146; 427/147; 427/148; 430/200; 430/202
(58) Field of Search ..................... 428/195, 913, 428/914; 156/230, 232, 233, 240, 241, 247, 277, 289, 250, 252, 257, 540; 427/146, 147, 148; 8/467, 471; 430/200, 202, 252

(56) References Cited

U.S. PATENT DOCUMENTS

| | | | |
|---|---|---|---|
| 3,886,020 | * 5/1975 | Shank, Jr. | 156/211 |
| 4,670,084 | * 6/1987 | Durand | 156/540 |
| 5,014,150 | 5/1991 | Breuer et al. . | |
| 5,255,143 | 10/1993 | Wolf et al. . | |
| 5,318,739 | 6/1994 | Katagiri et al. . | |

FOREIGN PATENT DOCUMENTS 59-062184 * 9/1984 (JP) ............................ B41M/3/12

* cited by examiner

*Primary Examiner*—Richard Crispino
*Assistant Examiner*—J. A. Lorengo
(74) *Attorney, Agent, or Firm*—Keil & Weinkauf

(57) ABSTRACT

A transfer film for printing onto at least partially three-dimensional articles, with the intention that surfaces having different planar portions can be printed onto at the same time and with equally good effect, is partially cut into in the region of contour lines of the planar portions. The article printed onto is characterized by scarcely visible printing defects in marginal zones of the printing. Applications include any articles having raised planar portions, for example containers, rotary knobs etc.

12 Claims, 4 Drawing Sheets

TRANSFER FOIL FOR PRINTING ON OBJECTS AND OBJECTS PRINTED THEREWITH

FIELD OF THE INVENTION

The invention relates to a transfer film for printing onto at least partially three-dimensional articles, the article having at least one raised portion with an upper level, which is arranged on a planar portion with a lower level, and the raised portion having a plan-view contour line.

It is known to print onto soft and hard articles by means of a transfer film, to which pressure is applied while increasing the temperature. The pressure is applied by means of a rolling or stamping device and the outer adhesive layer of the transfer film then adheres together with the actual color printing layer on the article.

DESCRIPTION OF THE RELATED ART

U.S. Pat. No. 3,886,020 describes a method of applying a decoration to plates or plate-shaped articles by means of round transfer films which have, as a major feature, radial incisions in the region in which the transfer film cannot follow the shape of the surface of the article owing to inadequate elasticity. As a result, in one application there can be seen triangular interruptions in the print, corresponding to the number of incisions, and in the other application there can be seen a partial overlapping of the areas lying to the left and right of the incisions, which means an overlaying of the print.

DE-B-3 813 359 (O. Z. 0078/5358) of the applicant also discloses printing onto the surface area of the housing of a magnetic tape cassette, both housing walls being treated simultaneously by printing on different patterns and/or colors in a single or repeated operation by means of printing units opposite one another in pairs. The printing units are in this case suitable, for example, for offset printing or inking-pad printing/tampon printing.

With this surface-area printing process, in the case of compact cassettes only the major faces of the housing are printed onto, either without printing onto the surfaces of the raised head portion or said surfaces are printed onto separately in a second printing station.

SUMMARY OF THE INVENTION

It is an object of the present invention to print onto the surface areas at different levels as simply as possible and in one operation and to provide a suitable transfer film for this purpose.

We have found that this object is achieved according to the invention with a transfer film of the type described at the beginning which is partially cut into in the region of the contour line(s). This prevents a pinching of the transfer film in the region of the contour line(s). This advantageously allows short printing times to be achieved along with troublefree film transport and satisfactory printing results on the articles printed onto.

In practice, in the case of an article having a raised portion with transitional regions, the cut/incisions are located in the region of the contour lines of the said transitional regions. This makes it possible to avoid the folds extending from each transitional region (each corner), normally forming in the case of a transfer film which has not been cut into, since the film cannot deform freely enough or be thermoformed freely enough there. During the printing operation in the printing unit, the parts of the film printed onto can be made to lie around the transitional region (the corners) without folds, so that a fold-free, good printing result can be obtained.

For the purposes of the invention, a transitional region is understood to mean a transition of the contour line from the region in the longitudinal direction into the region in the transverse direction, or vice versa. The transition may in this case take the form of a sharp or not so sharp corner (corner region) or else take the form of a curve (for example an arc).

With the arrangement of the incisions it is expedient for contour lines which run substantially parallel to the longitudinal direction of the transfer film to have complete longitudinal incisions and for contour lines running approximately transversely to the longitudinal direction to be provided with partial transverse incisions.

It is assumed here that the transfer film is subjected to winding forces, and consequently tensile forces, in the longitudinal direction and is consequently at risk of tearing and pinching.

When the longitudinal incisions are formed in practice, they are provided with extension incisions protruding beyond the contour line of the raised portion.

The length of the extension incisions should be dimensioned in such a way that it corresponds at least approximately to the distance of the lower level from the upper level, multiplied by the factor $\sqrt{2}$ (1.414 ... ).

This in turn avoids a pinching of the film and consequently the formation of folds.

The incisions may also be expediently formed as prepunched separating lines.

A transfer film for printing onto compact cassettes may in practice take the form that the substantially planar outer face(s) form the lower planar portion and the surface of the raised portion of the housing extending from the front wall forms the upper level and incisions are arranged on the contour line of the transitional regions of the raised portion of the housing.

In this way, the advantages of the invention are obtained by applying it to the printing of compact cassettes. The form taken by the incisions is advantageous if the partial transverse incisions are all the shorter the greater the plan-view angle of the transitional regions.

This achieves the effect that even relatively thin film material can be processed unproblematically and with good printing results. In addition, it is expedient if each partial transverse incision is dependent in its length on the size of the distance of the lower level from the upper level.

A three-dimensional article with printing produced on it by means of a transfer film, there being a raised portion having at least two transitional regions lying within a planar portion, the surface of the raised portion forming the upper level and the planar portion forming the lower level and the raised portion having a plan-view contour line, which encloses the transitional regions, is obtained according to the invention if printing defects in the marginal zone of the printing are present in the region of the contour line(s) between the transitional regions.

This allows the characteristic nature of the printing achieved by means of the transfer film according to the invention to be evident, without significantly impairing the printing quality.

The abovementioned can be readily seen from the fact that the marginal zone deviations of the printing are of the order of magnitude of 0.05–0.2 mm.

In the case of a compact cassette, the outer faces of which are at least partially printed on by means of a transfer film, the substantially planar outer faces of the cassette walls forming the planar portion with the lower level and the surface of the trapezoidal raised head portion forming the planar portion with the upper level, there being a trapezoidal contour line between the upper level and the lower level, a printing according to the invention is evident from the fact that printing defects in the form of marginal zone deviations from rectilinearity, in the range from about 0.05 to 0.2 mm, are present in the region of the contour line between the corner regions of the trapezoid shape which are joined to each other by the shorter side of the trapezoid shape.

In a more precise form, the printing defects may occur over a length (L2) of about 40 mm on the shorter parallel side of the trapezoid shape.

As already mentioned above, the printing defects are present only in a negligible order of magnitude. The advantages of transfer printing are very much predominant there.

DESCRIPTION OF THE PREFERRED EMBODIMENTS

The compact cassette K has a planar portion E1 on a lower level, which is formed by the outer face of the cassette housing wall, and a surface E2 on the raised head portion, which extends from the front side (S) of the cassette K, the surface E2 lying on an upper level. The contour line of the raised head portion is denoted by L. Between the contour line L and the surface E2 there may be an oblique transition D, represented here as narrow. Both, the face of the planar portion E1 and the surface E2, are to be printed on simultaneously by means of the transfer film F, which is represented as lying thereover and as transparent.

Without any measures being taken, when the two faces E1 and E2 are subjected to pressure the film F would form the diagrammatically indicated folds G, at least at the corner regions B1 and B2 of the raised head portion, and noticeable printing errors would undoubtedly occur in these regions, since the film F, which generally consists of polyester but may also consist of other suitable film materials, cannot deform freely enough, or cannot be thermoformed freely enough, in these transitional regions, here, corner regions B1 and B2.

The corner regions may be formed sharply cornered or else rounded-off to a greater or lesser extent.

Figure 1:
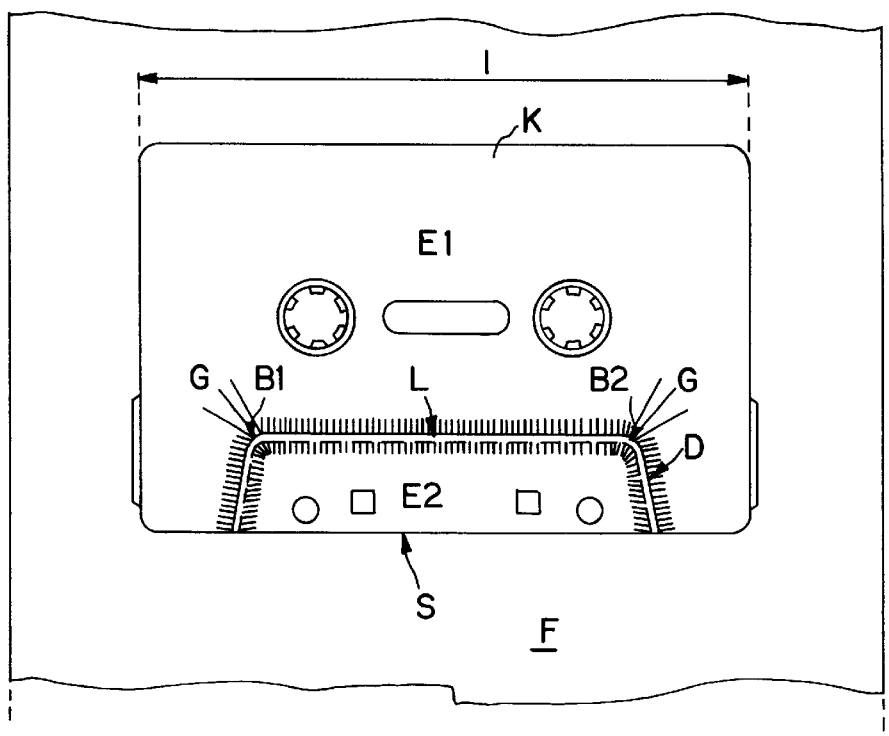
FIG. 1 shows a compact cassette with transfer film lying thereover, represented as a transparent film
Figure 2:
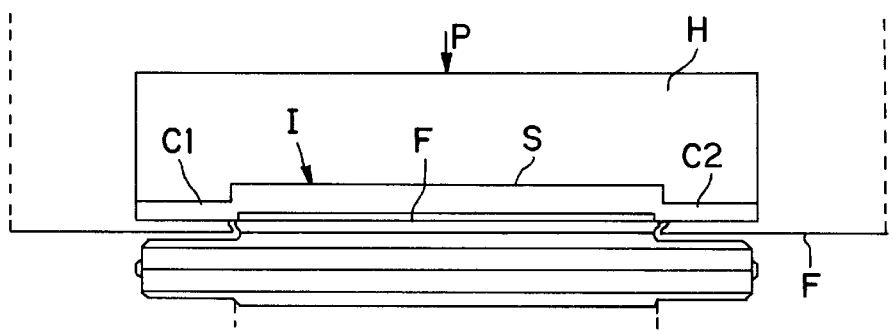
FIG. 2 shows the cassette with film from claim 1 and a printing apparatus
Figure 3:
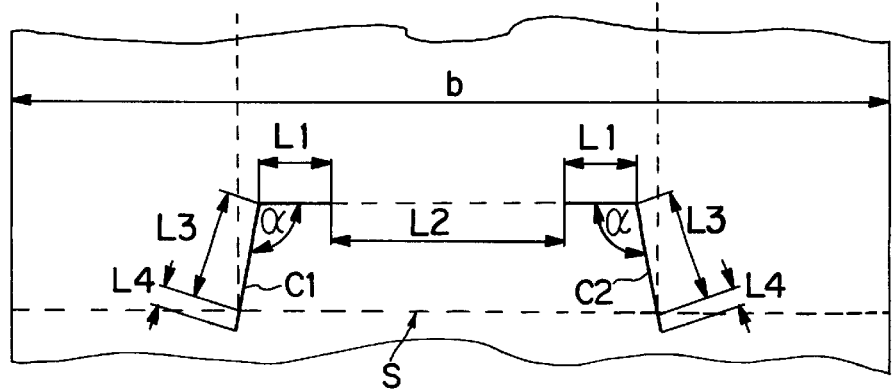
FIG. 3 shows the transfer film cut into according to the invention

In order to avoid the abovementioned errors, incisions C1 and C2 are provided in the transfer film F in the corner regions B1 and B2, as shown, for example, in FIGS. 2 and 3. Incisions C1 and C2 each comprise the approximately longitudinal incision of the length L3 and the transverse incision of the length L1, the approximately longitudinal incision of the length L3 being extended further up to the front side S of the cassette K by the extension incision of the length L4.

Represented in FIG. 2 is a punch H having at least one elastomeric lower layer I, at the point in time shortly before or shortly after a printing operation, during which said punch is to be subjected or has already been subjected to pressure. At the locations C1 and C2, the film F has already been cut into, which may have been performed directly by prepunching or by making a prepunched separating line and tearing.

Between the transverse incisions of the length L1 there is the intermediate part of the film which has not been cut into, with the length L2.

The entire width of the film is b, so that the film projects beyond the cassette K on both sides in the longitudinal direction.

Figure 4:
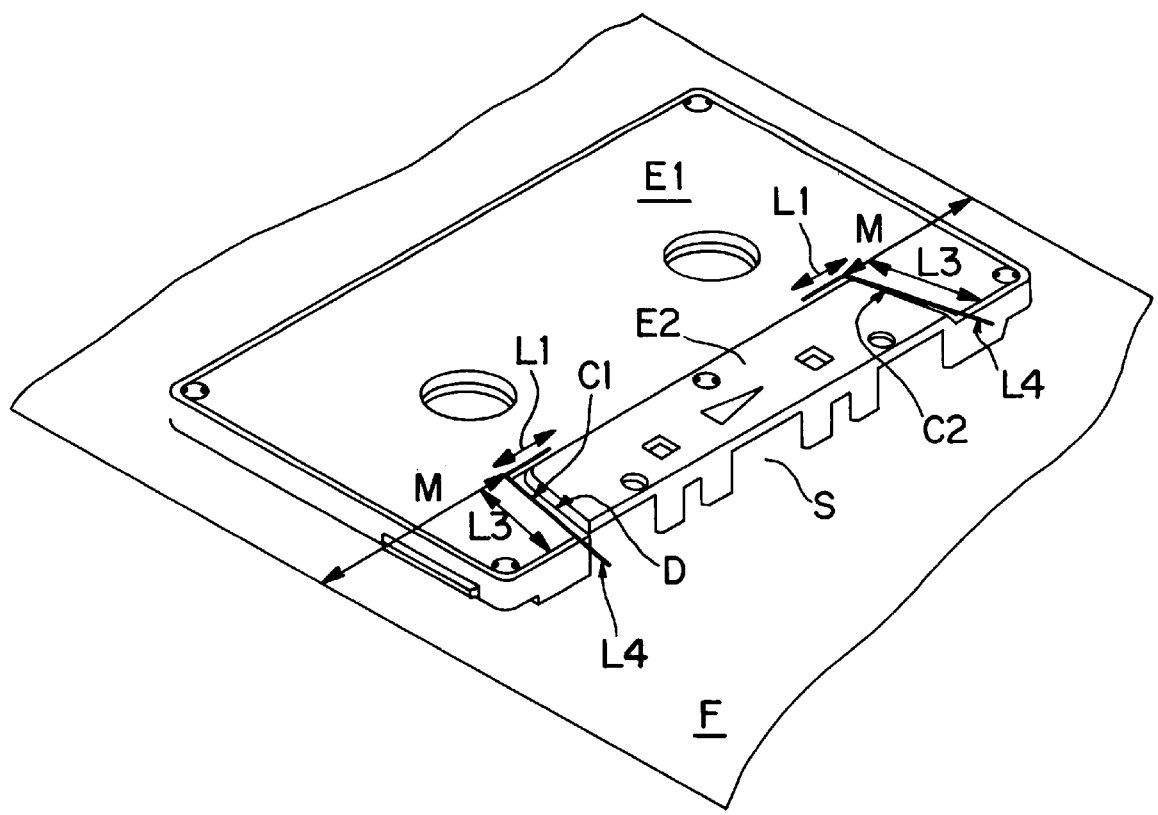
FIG. 4 shows the transfer film cut into according to the invention over a perspectively represented cassette half

The incisions C1 and C2 are located in the region of the contour line L, it also certainly being possible for the latter to lie at the outer edge of the transition D, as represented in FIG. 4. In FIG. 4, the three-dimensional arrangement of the incisions C1 and C2 is clearly evident. By virtue of the relief incisions C1 and C2, the film F can be made to lie smoothly and without folds around the corners without any trouble in the corner regions B1 and B2 during the downward movement of the punch H, the film F resting both on the face E1 and on the face E2 without any problems and consequently a satisfactory printing result being achieved.

The length L1 of the transverse incisions is critical, or requires careful consideration in its dimensioning, for several reasons:

1. The formation of folds is to be avoided.
2. The dimension M between the corner region B1, B2, where the longitudinal incision begins, and the lateral edge of the film is limited by the tear resistance of the film material.
3. The central part of the transported transfer film must not touch the cassette, in other words it must not sag, since on the side of the film facing the cassette the adhesive layer on the coating layer is exposed.
4. During printing, the film must rest in a planar position on the cassette in order to prevent any shifting of the motifs with respect to the cassette in the case of multicolor printing, known as inaccuracies of register.
5. The difference in levels of the faces E1 and E2 must be taken into consideration.
6. The angle of the transitional region or regions (corner regions) B1 and B2 plays a part.

The length L3 of the longitudinal incisions corresponds to the contour line length or edge length of the raised head portion. The length of the extension incisions L4 is dependent on the difference in levels or distance between the levels E1 and E2 "d", since the lower face E1 is the reference face and L4 must have at least the length of the diagonals (L4=at least $\sqrt{2} \cdot d$).

Figure 7:
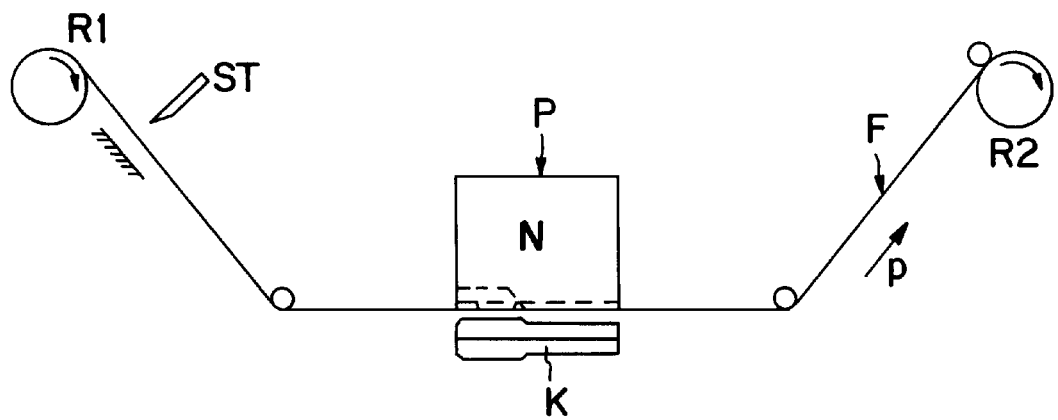
FIG. 7 shows a diagrammatic transfer film transporting apparatus and printing station

In FIG. 7, the path taken by the transfer film F during the printing process is diagrammatically represented.

From the unwinding roller R1, the film F runs through the punch ST, where the incisions are made, to the printing station N, which is subjected to the pressure P and in which the cassette K is printed simultaneously on the planar portions E1 and E2, to the winding-up roller R2, a web tension p of 6N being applied, which is necessary for the unwinding of the film F.

Figure 6:
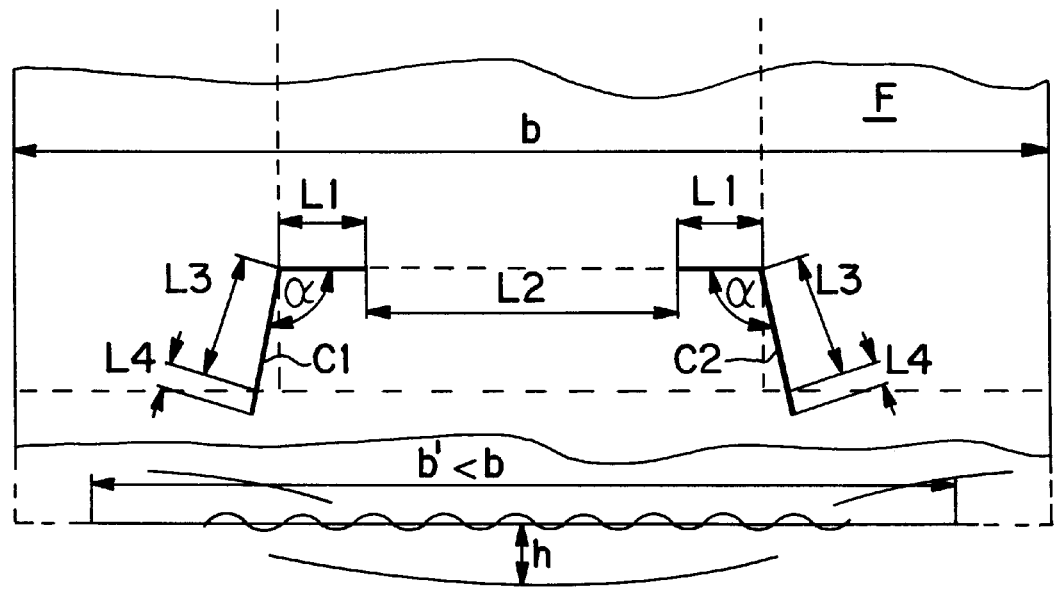
FIG. 6 shows a transfer film cut into according to the invention and an end-on view of the transported film

FIG. 6 shows the film F after the punching station ST and before winding up. The incisions C1 and C2 have been made. Underneath, a cross-sectional representation over the pinched film width b'<b can be seen. For the reasons of item 3, given the web tension of 6N, the film width b of 120 mm and the spatial circumstances of the printing station N, the dimension h, the height of the approximately wavelike sagging of the film F, must not exceed the value of h=3 mm.

Above the wave arc with the dimension h, the undulating shape of the film F in the central region is indicated.

With any predetermined film thickness, the height h of the sagging is dependent on the differential length L2, where L2=b−2M−2L1 or, in relation to the length of the cassette l: L2=l−2L1.

In the case of the compact cassette, this length is l=63.3 mm.

Figure 8:
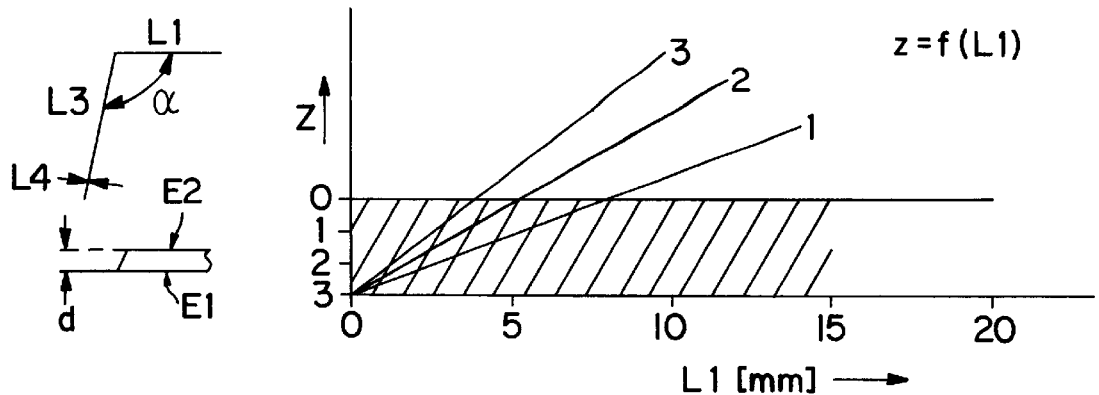
FIGS. 8–10 show diagrams for measurements of the fold formation and of the sagging of the transfer film
Figure 9:
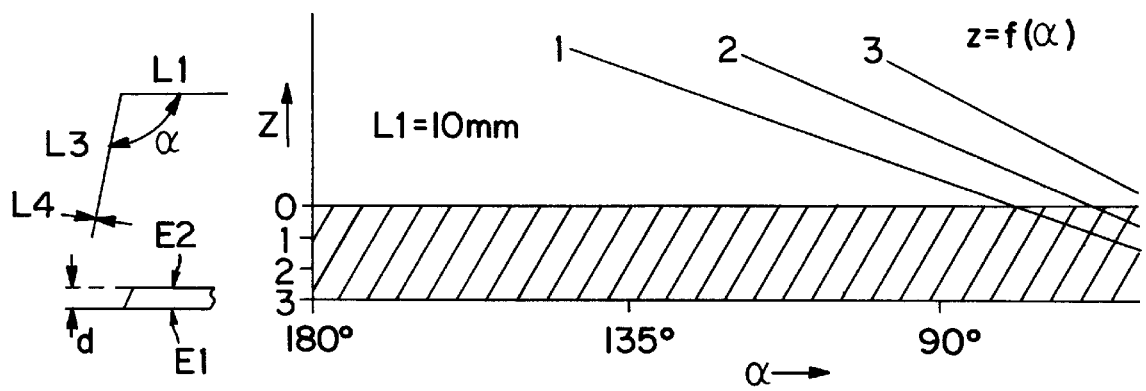
Figure 10:
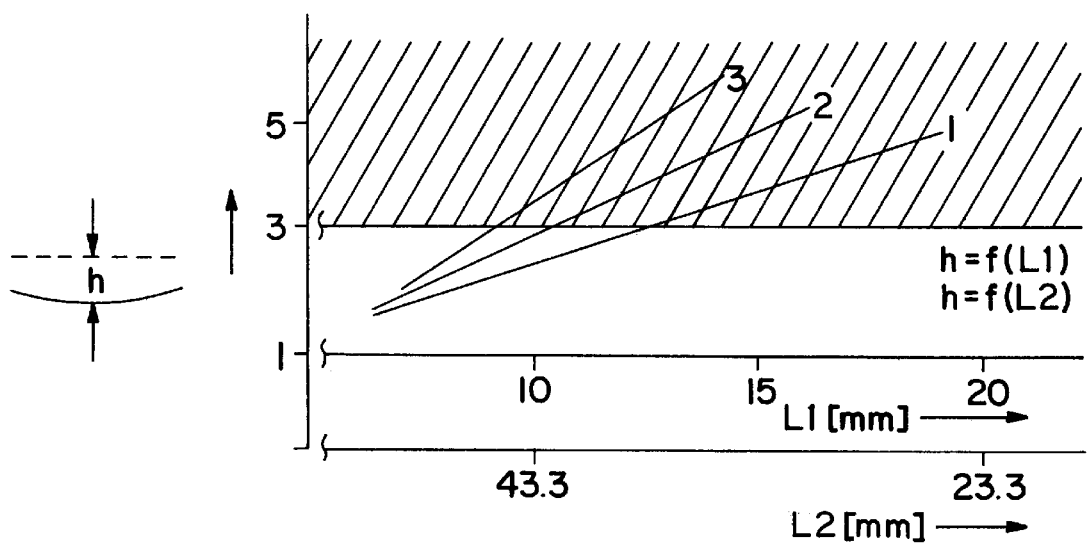

In the diagrams of FIGS. 8–10, the following measurement results are represented:

FIG. 8 z=f (L1)
z=number of folds
L1=length of the transverse incisions
FIG. 9 z=f (α)
α=angle of the corner region (between L1 and L3, L4)
FIG. 10 h=f (L1)
h=central sag height of the film
h=f (L2)

In all the tests, the film thicknesses were kept unchanged (1)=36 µm, (2)=25 µm, (3)=18 µm; in each case, the film material was polyester (PET).

In FIG. 8, the angle α1=102°, corner angle of the raised head portion in the case of compact cassettes, is kept constant.

There is produced an upper region, above the hatched region in which fold formation occurs, in which fold formation no longer occurs, irrespective of the respective film thickness. Thus, according to the desired film thickness (1)–(3), L1 is to be chosen correspondingly. The minimum length L1 is 4 mm in the case of film (1) and has no upper limit in the case of film (3), although even then the sagging effect of FIG. 10 occurs at some point.

In FIG. 9, the length L1 of the transverse incision is kept constant at L1=10 mm, corresponding for 2L1 to approximately 31.6% of the cassette length l, and the angle was varied from less than 90° to about 135°. Again, the lower hatched region is the region with the impermissible fold formation, and the region above is the fold-free region. With increasing angle α, wherever possible ≦90°, and fixed transverse incision length L1 =10 mm, the freedom from folds increases.

It has additionally also been established that the length L1 necessary for freedom from folds decreases with increasing angle α: at 180°, the length L1=0.

In FIG. 10, the permissible height h of the sagging in the center of the crosssection of the transported film F is plotted as a function of the transverse incision length L1 and of the differential length L2.

This produces the permissible region underneath the impermissible upper hatched region, in which there occur the instances of contacting the cassette which are to be avoided, that is to say with a maximum permissible height of the sagging of h=3 mm. This region is reached by film (1) at L1~14 mm, by film (2) at about L1=11 mm and by film (3) at about L1=9 mm; the corresponding L2 values become L2=35.5 mm (1), L2=41.3 mm (2) and L2=45.3 mm (3).

The differential length L2 has a particular significance, which emerges from the following.

It has already been mentioned that the transfer film comprises, for example, a PET film with a coating layer and/or ink layer and an embossing adhesive on the upper side thereof.

The printing takes place under the influence of pressure and temperature, the punch H being heated up to approximately 170° C. The heat causes the base film (PET) to be detached by means of a releasing layer or detaching layer present between the base film (PET) and the coating/ink layer. Consequently, the coating/ink/adhesive layer remains on the article to be printed on, that is to say in the example on the cassette.

Figure 11:
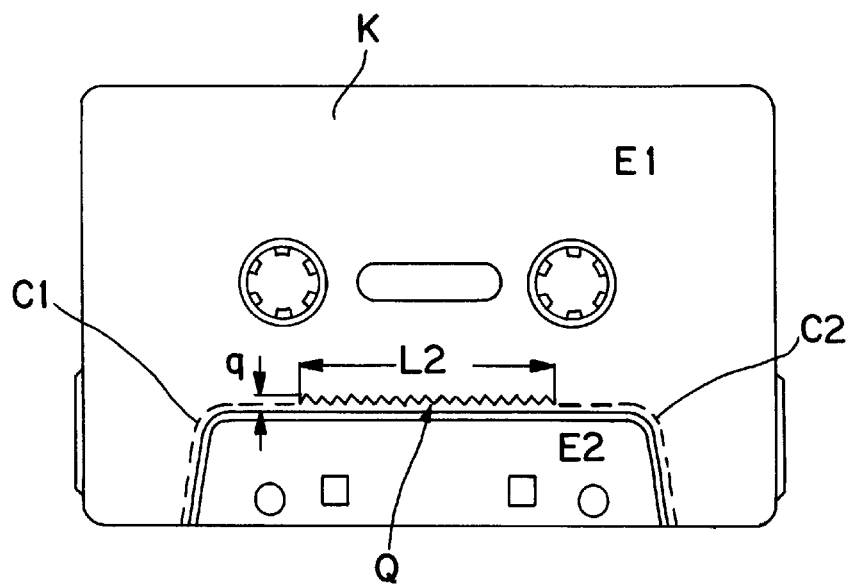
FIG. 11 shows a cassette printed on with a transfer film according to the invention.
Figure 5:
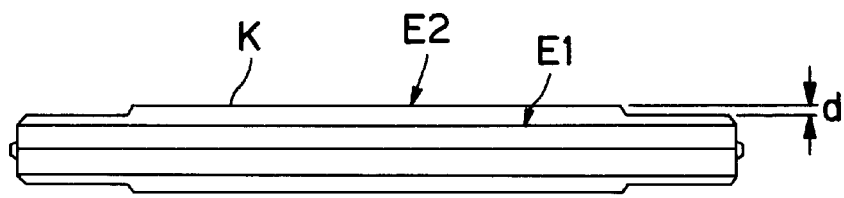
FIG. 5 shows a cassette in rear view

A cassette K printed on with the film F according to the invention, with incisions C1 and C2 (shown by dashed lines), has according to FIG. 11 a thermal separating line in the region of the differential length L2, i.e., during printing, in the region of the raised head portion a temperature of about 170° C. prevails and thereunder, on planar portion E1, room temperature of ~24° C. prevails.

In this region Q, which is formed approximately by the length L2, prong-like and wave-like formations occur, offset by dimension q~0.05–0.2 mm, which represent printing defects in the marginal zone of the printing. These printing defects are normally scarcely evident, but are characteristic of printing with a transfer film with incisions according to the present invention.

The transfer film according to the present invention was successfully used to produce cassettes printed onto with a single color and multiple colors on one side and on both sides, since large numbers can be produced at high speed with little use of labor, machinery and materials.

It goes without saying that the transfer film described can be used for many articles having planar portions on different levels, for example for rotary knobs or switches having a central part and a flange part, for cases and containers, for three-dimensional printing in the art world etc.

We claim:

1. A method for printing onto a three-dimensional article (K) in one operation, said process comprising transferring an image from a transfer film to an article (K) by applying pressure to the transfer film and increasing the temperature while the transfer film is in contact with the article (K), wherein the article (K) has a planar upper level (E2), a planar lower level (E1), and a plan-view contour line (L) between the upper level (E2) and the lower level (E1), this contour line (L) having at least two transitional regions (B1, B2) formed by the transition of the contour line (L) from a region in the longitudinal direction into a region in the transverse direction, it being possible for the at least two transitional regions to be formed as corners or curves, wherein the transfer film has at least two incisions (C1, C2) and a non-cut-into part (L2) between the incisions (C1, C2), and wherein the two incisions (C1, C2) correspond to the at least two transitional regions (B1, B2) during printing.

2. The method of claim 1, wherein the incisions (C1, C2) have parts that correspond to the regions of the plan-view contour line (L) which run in the longitudinal direction which are formed as complete longitudinal incisions (L3) and parts that correspond to the regions of the plan-view contour line (L) which run approximately transversely to the longitudinal direction which are formed as partial transverse incisions (L1) and the extents of the transverse incisions (L1) and the longitudinal incisions (L3) form a plan-view angle (α).

3. The method of claim 2, wherein the complete longitudinal incisions (L3) are extended by the amount L4, which corresponds at least approximately to the product of the difference between the levels (d) multiplied by 1.414, beyond the plan-view contour line (L).

4. The method of claim 1, wherein the incisions (C1, C2) are formed as prepunched separating lines.

5. The method of claim 2, wherein the length of the partial transverse incisions (L1) becomes smaller with increasing plan-view angle (α).

6. The method of claim 2, wherein the length of the partial transverse incisions (L1) is dependent on the size of the difference in levels (d).

7. The method of claim 1, wherein printing defects in the region of the plan-view contour line (L) are avoided by partial incisions (C1, C2) and wavelike printing defects (Q), which are not visible to the naked eye, are produced on the finished product in the marginal zone of the printing in the region (L2) of the plan-view contour line (L).

8. The method of claim 7, wherein the printing defects produced on the three-dimensional article in the marginal region of the printing are of the order of magnitude of 0.05 mm to 0.2 mm.

9. The method of claim 1, wherein the three-dimensional article is a cassette for recording media in tape form with a characteristic trapezoidal raised head portion, wherein printing defects, invisible to the naked eye, occur in the form of marginal-zone rectilinearity deviations over a length (L2) of about 40 mm on the shorter side of the trapezoid shape.

10. The method of claim 2, wherein the three-dimensional article is a cassette for recording media in tape form with a characteristic trapezoidal raised head portion, wherein printing defects, invisible to the naked eye, occur in the form of marginal-zone rectilinearity deviations over a length (L2) of about 40 mm on the shorter side of the trapezoid shape.

11. The method of claim 1, wherein the upper level (E2) and the lower level (E1) are parallel.

12. The method of claim 2, wherein the non-cut-into part (L2) corresponds to a straight portion of the contour line (L) during printing.

* * * * *